US006975631B1

(12) United States Patent
Kastenholz

(10) Patent No.: US 6,975,631 B1
(45) Date of Patent: Dec. 13, 2005

(54) NETWORK PACKET FORWARDING LOOKUP WITH A REDUCED NUMBER OF MEMORY ACCESSES

(75) Inventor: Frank Kastenholz, Chelmsford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 09/237,128

(22) Filed: Jan. 25, 1999

Related U.S. Application Data

(60) Provisional application No. 60/090,028, filed on Jun. 19, 1998.

(51) Int. Cl.[7] .............................................. H04L 12/28

(52) U.S. Cl. ..................... 370/401; 370/389; 370/392

(58) Field of Search .............................. 370/235, 252, 370/351, 352, 356, 392, 389, 394, 419, 463, 370/400, 401, 46.6; 709/242; 707/6

(56) References Cited

U.S. PATENT DOCUMENTS

| 5,032,987 A |   | 7/1991  | Broder et al. ............... 364/200 |
|-------------|---|---------|--------------------------------------|
| 5,353,283 A | * | 10/1994 | Tsuchiya ..................... 370/392 |
| 6,052,683 A | * | 4/2000  | Irwin ............................ 707/8 |
| 6,144,662 A |   | 11/2000 | Colmant et al. ............. 370/390 |
| 6,337,861 B1| * | 1/2002  | Rosen ......................... 370/389 |
| 6,392,996 B1| * | 5/2002  | Hjalmtysson ............... 370/252 |
| 6,563,823 B1| * | 5/2003  | Przygienda et al. ........ 370/392 |
| 6,611,522 B1| * | 8/2003  | Zheng et al. ........... 370/395.21 |

FOREIGN PATENT DOCUMENTS

WO    WO 99/13619    3/1999

OTHER PUBLICATIONS (1993) "Memory Organization Scheme For The Implementation Of Routing Tables In High Performance IP Routers", *IBM Technical Disclosure Bulletin*, vol. 36(2), pp. 151-153.

(1995) "Local Area Network Switch Frams Lookup Technique for Increased Speed and Flexibility", *IBM Technical Disclosure Bulletin*, vol. 38,(7), pp. 221-222.

Degermark, M. et al. Small Forwarding Tables for Fast Routing Lookups. ACM SIGCOMM'97 Conference: Applications, Technologies, Architectures, and Protocols for Computer Communication, Sep. 14-18, 1997, Cannes, France. *Computer Communication Review* (1997) vol. 27, No. 4, pp. 3-14.

Waldvogel, M. et al. Scalable High Speed IP Routing Lookups. ACM SIGCOMM'97 Conference: Applications, Technologies, Architectures, and Protocols for Computer Communications, Sept. 14-18, 1997, Cannes, France. *Computer Communication Review* (1997) vol. 27, No. 4, pp. 25-38.

Copy of U.S. Appl. No. 09/336,311, filed Jun. 18, 1999; Qin Zheng et al.; A Quality of Service Facility In A Device For Performing IP Forwarding And ATM Switching; 102 pages.

(Continued)

*Primary Examiner*—Duc Ho
(74) *Attorney, Agent, or Firm*—Harrity & Snyder, LLP

(57) ABSTRACT

A switch/router contains intelligence for more quickly determining a next hop for an network layer packet. A network forwarding lookup table or array structure is configured so as to minimize the number of memory accesses required. This results in a decrease in time due to memory access and a decrease in computational overhead due to the memory accesses. In one embodiment, a first forwarding lookup is indexed by the first 16 bits of a destination address. A second forwarding lookup is indexed by the subsequent 8 bits of the destination address, and a final third forwarding lookup is indexed by the last 8 bits of the destination address. Each entry within a forwarding lookup contains either direction as to how properly forward the packet or reference to a next subsequent forwarding lookup.

18 Claims, 11 Drawing Sheets

OTHER PUBLICATIONS

Copy of U.S. Appl. No. 09/336,229, filed Jun. 18, 1999; Steven R. Willis; Device for Performing IP Forwarding And ATM Switching; 62 pages.

Copy of U.S. Appl. No. 09/336,090, filed Jun. 18, 1999; Frank Kastenholz et al.; An Interconnect Network For Operation Within A Communication Node; 57 pages.

Copy of U.S. Appl. No. 09/335,947, filed on Jun. 18, 1999; Gregg Bromley et al.; Method And System For Encapsulating/Decapsulating Data On A Per Channel Basis In Hardware; 59 pages.

Copy of U.S. Appl. No. 10/120,380, filed Apr. 12, 2002; Pradeep Sindhu et al.; Systems And Methods for Memory Utilization During Packet Fowarding; 25 pages.

* cited by examiner

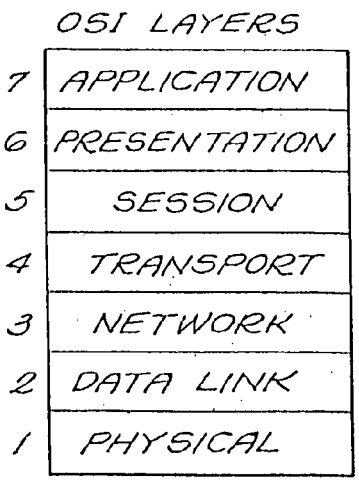
FIG. 1
(PRIOR ART)
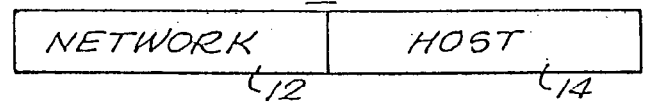
FIG. 2
(PRIOR ART)
| ADDRESS, 40 | PREFIX LENGTH, 42 | INTERFACE, 44 |
|---|---|---|
| 1.0.0.0 | 8 | C |
| 1.2.3.0 | 24 | B |
| 1.2.4.0 | 24 | A |
| 1.2.0.0 | 16 | A |
30 — 1.0.0.0
32 — 1.2.3.0
34 — 1.2.4.0
36 — 1.2.0.0
FIG. 4A
(PRIOR ART)

NETWORK PACKET FORWARDING LOOKUP WITH A REDUCED NUMBER OF MEMORY ACCESSES

RELATED APPLICATIONS

This application claims the benefit of priority under 35 U.S.C. 119(e) to U.S. provisional application Ser. No. 60/090,028, filed Jun. 19, 1998, the entire contents of which are hereby incorporated by reference.

TECHNICAL FIELD

The present invention relates generally to switches and routers and more particularly to a network packet forwarding lookup with a reduced number of memory accesses.

BACKGROUND OF THE INVENTION

Computer networks have typically been viewed as being divisible into several layers. The Open Systems Interconnection (OSI) reference model established by the International Standards Organization (ISO) defines a computer network as having seven layers. FIG. 1 depicts the seven layers that are defined by the OSI reference model. Layer one is the physical layer, which is responsible for transmitting unstructured bits of information across a link. Layer two is the data link layer. The data link layer is responsible for transmitting chunks of information across a link. Layer three is the network layer. The network layer is responsible for enabling any pair of systems in the computer network to communicate with each other. Layer four is the transport layer. The transport layer is responsible for establishing a reliable communication stream between a pair of systems. Layer five is the session layer, which is responsible for offering services such as dialogue control and chaining. Layer six is the presentation layer, which provides a means by which applications can agree on representations for data. Layer seven is the application layer in which applications such as file transfer services and management services operate.

The Internet protocol (IP) is a layer three network protocol. The IP protocol is a messenger protocol that is part of the Transmission Control Protocol (TCP)/IP protocol suite. TCP is transport layer protocol that facilitate reliable byte stream communication. IP sets forth an addressing scheme that is useful in tracking Internet addresses for different nodes, recognizing incoming messages and forwarding outgoing messages. Each IP packet is a data packet that contains header information and a payload.

IP addresses are 32 bit globally unique addresses that are generally represented in a dotted decimal notation where the dots (i.e. periods) separate the four bytes of the address. An example of an IP address in dotted decimal notation is "1.2.3.4." Although an IP address is a single 32 bit value, each IP address contains two pieces of information. As shown in FIG. 2, each IP address 10 contains a network identifier 12 and a host identifier 14. The host identifier identifies the host system to which the IP address is assigned. The network identifier identifies the network in which the host system resides.

In order to appreciate how IP addresses are used, it is helpful to consider an example. FIG. 3 shows an example of a computer network in which IP packets are sent between host 20 and host 24. In this example, host 20 is part of network 1 and host 24 is part of network 2. A number of switching nodes 22 interconnect network 1 with network 2. These switching nodes may be switches and/or routers that forward IP packets between network 1 and network 2. Host 24 is host number 97 within network 2. Thus, expressing the address of host 24 in <network, host> form, the IP address for host 24 is <2, 97>. IP packets are forwarded from their source to their destination on a hop by hop basis. Each switching node 22 that an IP packet encounters on the path from host 20 to host 24 constitutes a separate hop. The IP packet has a header that contains a destination IP address. The destination IP address specifies host 24 as the destination. Each switching node 22 on the path between host 20 and host 24 uses the destination address in determining a next hop.

IP addresses were previously divided into three classes: Class A, Class B and Class C. The number of bits allocated to the network identifier 12 in the IP address and the number of bits allocated to the host identifier in the IP address was originally determined by the class of the IP address. With class A IP addresses, the host identifier was allocated three bytes; with class B IP addresses, the host identifier was allocated two bytes; and with class C IP addresses the host identifier was allocated a single byte. Many parties objected to this rigid bit allocation between host identifier and network identifier. As a result, a more flexible scheme was developed where masks were used to identify which bits in an IP address were allocated to the host identifier and which bits were allocated to the network identifier. A number of popular IP routing protocols utilize such masks.

Routers generally include routing tables to assist in forwarding IP packets to their proper destinations. The entries in the routing table hold forwarding information for IP address prefixes (i.e. portions of the IP addresses containing the most significant bits) for which routing information is known. For example, it may be known that all IP packets destined to network 1.2 should be forwarded out over interface A of the node; thus, the entry encodes this knowledge.

FIG. 4A shows an example of four routing table entries 30, 32, 34 and 36. Each routing table entry holds an address 40, a prefix length 42 and an interface 44. The address 40 field contains a prefix of an IP address. The prefix length 42 identifies the length of the prefix within the address field 40. For entry 30, the prefix is only a single byte (i.e. 8 bits) long. The interface 44 identifies the interface to which packets starting with the given prefix may be routed. The interface is a logical abstraction of a port (or other information) that identifies where a range of IP addresses (i.e. the addresses in the range defined by the prefix) should be directed.

FIG. 4B shows an example of the topology of a portion of a computer network wherein the forwarding table entries 30, 32, 34 and 36 are utilized. In particular, node 50 has three interfaces: A, B and C. Interface C leads to network 1. The notation ⅛ in FIG. 4B indicates that the IP address for the network has a prefix value of 1 and that it is 8 bits in length. Interface B leads to a portion of the computer network having IP addresses that start with the prefixes 1.2.3. Interface A leads to destinations having IP addresses that start with the prefix 1.2.4 and 1.2. Specifically, interface A leads to node 52, which, in turn, leads to the other destinations 1.2.4 and 1.2.

For each IP packet received by a node, the longest matching prefix found in the routing table is used to route the IP packet. Consider an IP packet that has a destination address of 1.2.4.7. In such an instance, entries 30, 34 and 36 contain matching prefixes for this IP address. Prefix 1.2.4, however, is the longest prefix and, thus, entry 34 is used to route the IP packet out interface A toward destination 1.2.4.

In conventional routers, the routing table is typically represented as a patricia tree. A patricia tree is a tree data structure that is used to simplify searching of the routing table. The patricia tree employs a binary representation of keys without storing keys in the nodes. FIG. 5 shows an example of a portion of a patricia tree 60. Each node is associated with a particular portion of an IP address prefix. For example, the node $b_0$ is associated with bit 0 of an IP address prefix (i.e. the first bit in an IP address prefix). Each node may contain pointers to child nodes or to terminations. Furthermore each node may have a reference to a routing table entry for the prefix that the node represents. Each pointer leading from a node is associated with a bit value for the next bit in the prefix for the node. The structure is organized as a tree such that each level of the tree represents a successive bit sequence. Thus, node $b_1$ of FIG. 5 represents a two bit sequence in the prefix where the first bit has a value of 0. The table entries are associated with the last node of the prefix. In the example of FIG. 5, entry 62 for the prefix 1, which is one byte in length (or 8 bits in length), is referenced by the node $b_8$ for the prefix bit sequence of "00000001." Similarly, entry 64 is referenced by the node $b_{16}$. Terminations, such as termination 65, are provided in the patricia tree to represent prefixes for which there is no associated forwarding table entry.

The patricia tree may also be implemented in a different fashion. The patricia tree may store the table entries so that the pointers point to the table entries (i.e. the table entries are in the tree as nodes). Hence, for a given node, a pointer associated.

The patricia tree provides a convenient search mechanism for conducting a binary search to identify whether any entries are associated with a particular prefix or portion of a prefix. One difficulty with the use of a patricia tree, however, concerns the number of memory accesses that must be performed to utilize the patricia tree. Addressing a node in the patricia tree requires a memory access. Thus, to search down to level 8 of the tree requires 8 memory accesses. Such memory accesses can be quite expensive in terms of time and computational overhead. Given that routers often handle extremely large volumes of IP packets, time and computational overhead are scarce resources that need to be conserved.

SUMMARY OF THE INVENTION

The present invention addresses the limitation discussed above of conventional IP packet routing schemes by providing an packet forwarding approach that requires at most three forwarding table lookup accesses per destination address. By minimizing the number of lookup accesses, the present invention decreases computational overhead and the time required to determine how to properly route a packet. In one embodiment, the present invention uses three types of lookup arrays. A first type of lookup array is indexed by the first two bytes of a destination IP address for an IP packet. In some embodiments, the destination address is not used alone for the lookup; rather other fields such as the source address, destination port and source port are used in conjunction with the destination address during lookup. Nevertheless, it is worth considering the case wherein only the destination address is used. The second type of lookup array is indexed by the third byte of the destination IP address. It contains entries for prefixes in the range of greater than two bytes and less than or equal to three bytes. Each entry in the first lookup array may have a separate associated second lookup array. If the second does not contain a matching entry, there are no entries that match the prefix formed by the first three bytes of the destination IP address; hence, the third type of lookup array must be used. The final byte of the destination IP address is used as an index to this table. A separate third lookup array may be provided for each entry in a second lookup array. Thus, the lookup arrays are organized as a tree of lookup arrays in one embodiment of the present invention.

In accordance with one aspect of the present invention, a method is practiced in a digital logic device for forwarding data packets. The device includes a storage element having addressable storage locations. Multiple bits from header data for network layer packet are used as an index to locate a selected one of the storage locations. This selected storage location provides information regarding how the device should forward the IP packet. This information is utilized to forward the packet toward the destination.

In accordance with another aspect of the present invention, a first and a second forwarding lookup are provided in a device for forwarding an IP packet toward a destination, where the destination has a destination address comprising a sequence of bits. A prefix of multiple bits for the destination address is used as an index to locate a first entry in the first forwarding lookup. The first entry provides direction to the second forwarding lookup. The next sequential set of bits that follows the prefix of the destination address is used as an index to locate a second entry in the second forwarding lookup. The contents of the second entry are employed in forwarding the IP packet towards the destination address.

In accordance with a further aspect of the present invention, a forwarding lookup that has locations that are indexed by multiple bits is provided within a switch. The switch is in a network that employs a connectionless network protocol. For each data packet to be forwarded to a destination address, bits in the destination address are used to locate and access at least one location in the forwarding lookup. The location that is accessed is used to forward the data packet. Fewer locations are provided in the forwarding lookup than bits provided in the associated destination address.

In accordance with a further aspect of the present invention, a device for forwarding network layer packets to destinations (wherein the packets have associated header data) includes a first lookup structure. The first lookup structure holds entries that provide information regarding how to forward packets to their destinations. The entries are indexed by multiple bits. The device also includes a forwarding controller for using multiple bits from the header data as indices to locate entries in the first lookup structure. The forwarding controller also uses the entries in the first lookup structure in directing the forwarding of the packets to the destinations.

In accordance with another aspect of the present invention, a switch/router directs network IP packets towards destinations. The switch/router includes a first lookup array containing entries that are indexed by leading bits of destination addresses for IP packets. Each entry contains an instruction to assist in forwarding an IP packet towards a destination. The switch/router also includes a second lookup array containing entries indexed by a successive set of bits that follow the leading bits in the destination addresses for IP packets. Each entry contains an instruction to assist in forwarding an IP packet towards a destination. The switch/router additionally includes a third lookup array containing entries indexed by a set of trailing bits that followed the successive set of bits in the destination addresses for IP packets. Each entry in the third lookup array contains an instruction to assist in forwarding an IP packet. The switch/ router includes a forwarding engine for forwarding IP packets to the destinations. The forwarding engine accesses at least one entry in the lookup arrays that is indexed by a destination address for the IP packet being forwarded. The forwarding engine executes the instruction contained in the entry that is accessed.

BRIEF DESCRIPTION OF THE DRAWINGS

An illustrative embodiment of the present invention is described below relative to the following drawings.

FIG. 1 depicts the seven layers found in the OSI reference model.

FIG. 2 depicts the major logical component of an IP address.

FIG. 4A depicts an example of conventional routing table entries.

DETAILED DESCRIPTION OF THE INVENTION

The illustrative embodiment of the present invention provides a switch/router that forwards network layer packets toward their destination with fewer memory accesses on average during network layer forwarding lookup than conventional switching nodes. "Network layer packet" refers to a packet that complies with an OSI layer 3 protocol. Although the illustrative embodiment of the present invention will be described below for use with IP packets, the present invention may also be used for different types of network address lookup, such as with CLNP and other protocols. The switch/router employs a first forwarding lookup that may be indexed by the leading sixteen bits of the destination address for an IP packet. A second forwarding lookup is also provided within the switch/router. The second forwarding lookup may be indexed by the next successive eight bits in the destination address that follows the first sixteen bits. Lastly, a third forwarding lookup is provided in the switch/router. The third forwarding lookup may be indexed by the final 8 bits of the destination address of an IP packet. Entries in the third forwarding lookup are used when entries in the first forwarding lookup and in the second forwarding lookup are not sufficient to forward the IP packet toward a destination.

The illustrative embodiment will be described relative to an implementation that uses IP, version 4. Nevertheless, those skilled in the art will appreciate that the present invention may also be practiced with other versions of IP, including version 6.

Analysis of IP packet addresses and traffic patterns reveals that the majority of IP packets only require a single lookup in the first forwarding lookup (i.e. most IP packets may be properly routed based on the first two bytes of their destination IP addresses). Thus, the majority of IP packets require only a single memory access. An overwhelming percentage of IP packets require only either a lookup in the first forwarding lookup or a lookup in both the first forwarding lookup and the second forwarding lookup. Thus, an overwhelming percentage of IP packets may be forwarded with only two memory accesses for IP lookup. As a result, the illustrative embodiment provides substantial time and computational savings.

In the illustrative embodiment, each lookup array entry or element contains an instruction. The instruction is executed by a lookup engine that is provided in the switch/router. The instruction tells the lookup engine what to do next during the lookup process. For example, an instruction in an element in the first forwarding lookup may instruct the lookup engine to access an element in the second forwarding lookup. The element that is accessed in the second forwarding lookup array may contain an instruction directing the lookup engine to use a particular data structure, that holds information regarding which output port to use in forwarding the IP packet.

Figure 3:
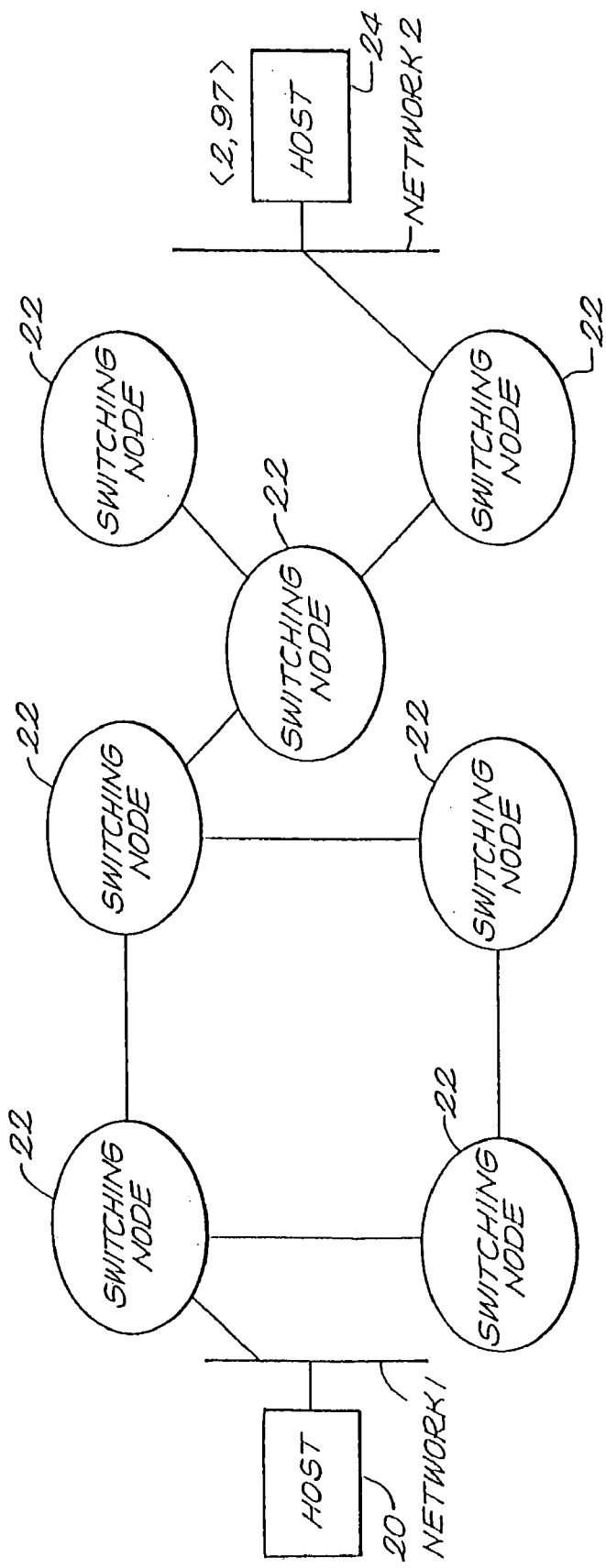
FIG. 3 shows an example of a conventional computer network in which an IP address is employed.
Figure 4B:
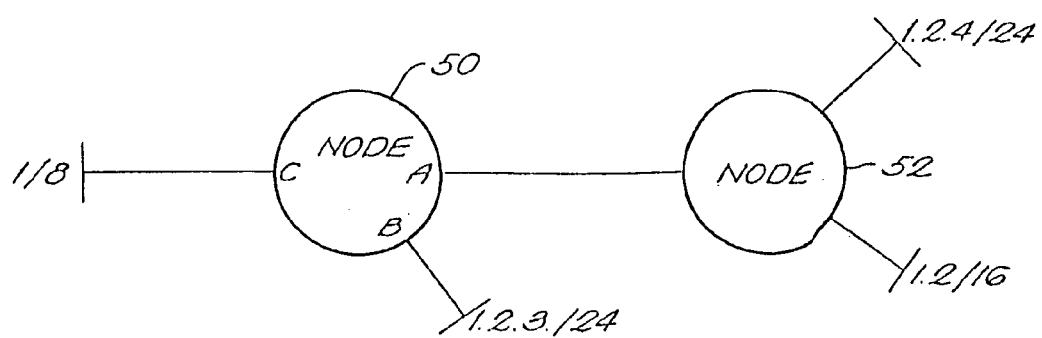
FIG. 4B depicts an example of a conventional computer network for which the routing table entries of FIG. 4A are provided.
Figure 5:
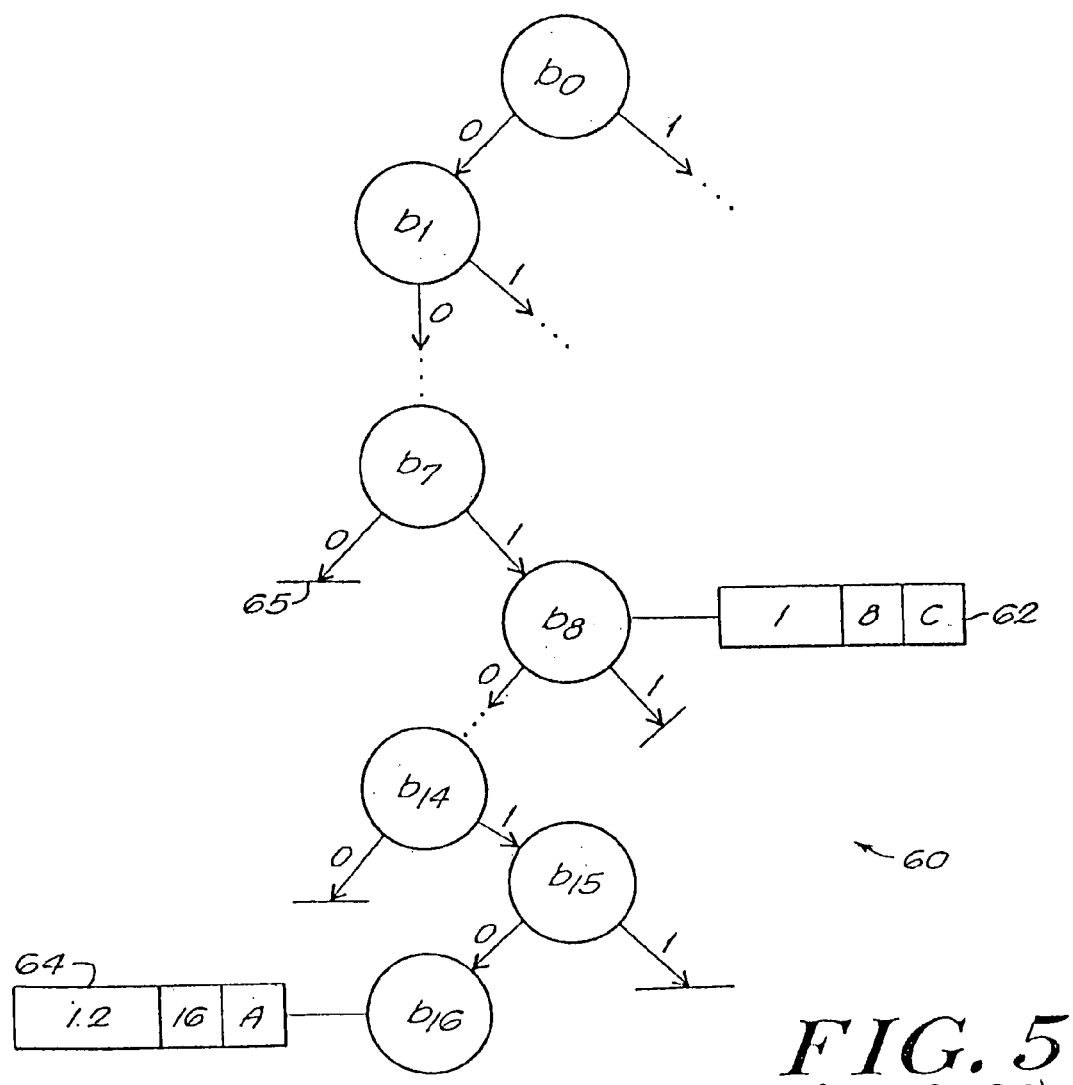
FIG. 5 depicts an example of a portion of a patricia tree that is used to locate forwarding table entries in a conventional system.
Figure 6:
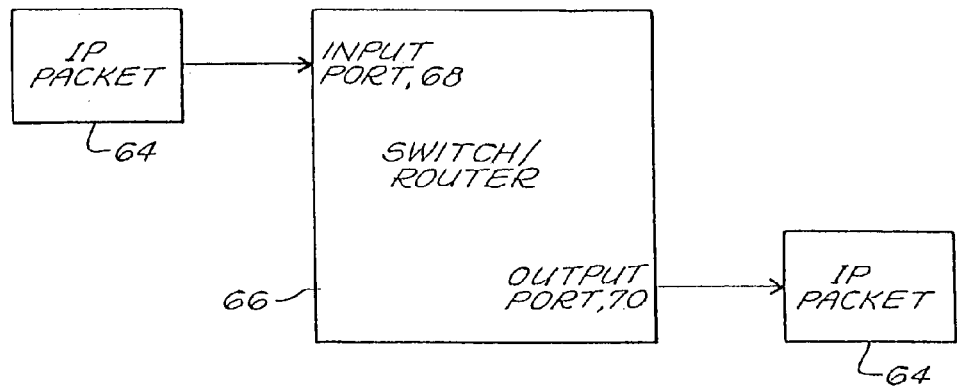
FIG. 6 is a block diagram illustrating the role of the switch/router in practicing the illustrative embodiment of the present invention.

The switch/router of the illustrative embodiment is presumed to be positioned in a computer network where IP packets need to be forwarded toward destinations. The switch/router of the illustrative embodiment is suitable for use in computer networks, such as, for example, the Internet, an intranet or an extranet. FIG. 6 depicts the basic role of the switch/router 66 in the illustrative embodiment. In particular, an IP packet 64 enters the switch/router 66 via an input port 68. The switch/router 66 determines which output port 70 to use in outputting the IP packet 64 so as to ensure that the IP packet heads towards the desired destination. The IP packet 64 may be encapsulated into frames and may be enter the switch/router 66 along with other IP packets. The decision regarding how to forward the IP packet 64 within the switch/router 66 involves IP forwarding lookup, which will be described in more detail below.

Figure 7:
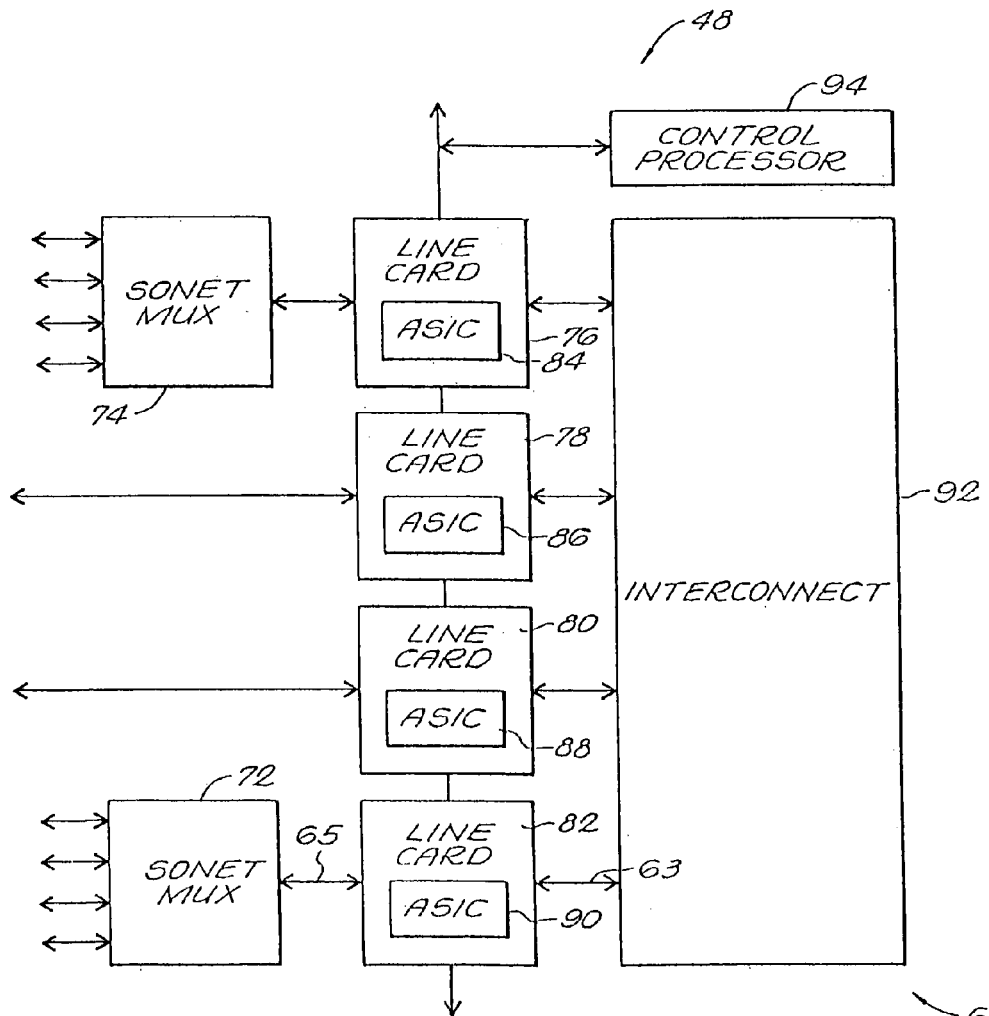
FIG. 7 is a block diagram illustrating major components of the switch/router of FIG. 6.

FIG. 7 illustrates an example of a portion of the basic layout for the switch/router 66. The components shown in FIG. 7 may reside in a single box (i.e. housed within a single housing). The switch/router 66 is able to receive and process multiple input data streams, concurrently. These input streams arrive at the switch/router 66 over separate links. In the illustrative embodiment these input data streams are SONET data streams (SONET is an acronym for synchronous optical networks). SONET is a standard that specifies a synchronous level one transport signal at 51.84 megabits per second. This standard defines a family of fiber-optic transmission rates that facilitates the internetworking of transmission products for multiple venders. The standard defines a physical interface, optical line rates known as Optical Carrier (OC) signals, and a frame format. The SONET optical line rates are defined as follows:

| OC Level | Line Rates | Capacity |
| --- | --- | --- |
| OC-1 | 51.84 Mbps | 28 DS1s or 1 DS3 |
| OC-3 | 155.52 Mbps | 84 DS1s or 3 DS3s |
| OC-9 | 466.56 Mbps | 252 DS1s or 9 DS3s |
| OC-12 | 622.08 Mbps | 336 DS1s or 12 DS3s |
| OC-18 | 933.12 Mbps | 504 DS1s or 18 DS3s |
| OC-24 | 1.244 Gbps | 672 DS1s or 24 DS3s |
| OC-36 | 1.866 Gbps | 1008 DS1s or 36 DS3s |
| OC-48 | 2.488 Gbps | 1344 DS1s or 48 DS3s |
| OC-96 | 4.976 Gbps | 2688 DS1s or 96 DS3s |
| OC-192 | 9.953 Gbps | 5376 DS1s or 192 DS3s |
| OC-255 | 13.21 Gbps | |

In the above table, DS refers to a known standardized hierarchy of digital signal speeds used to classify capacities of lines and trunks. The fundamental speed level is DS-0, which corresponds with 64 kilobits per second. DS-1 corresponds to 1.544 megabits per second, and DS 3 corresponds to 44.736 megabits per second.

Each line card 76, 78, 80 and 82 is designed to receive an OC-48 input stream, which corresponds to the 2.488 gigabits per second (Gbps). Multiplexers 72 and 74 are provided to multiplex four OC-12 input data streams in order to produce an OC 48 input data stream at line cards 82 and 76, respectively. In the example depicted in FIG. 7, it is presumed that separate OC-48 input data streams are received by line cards 78 and 80, respectively.

Figure 8:
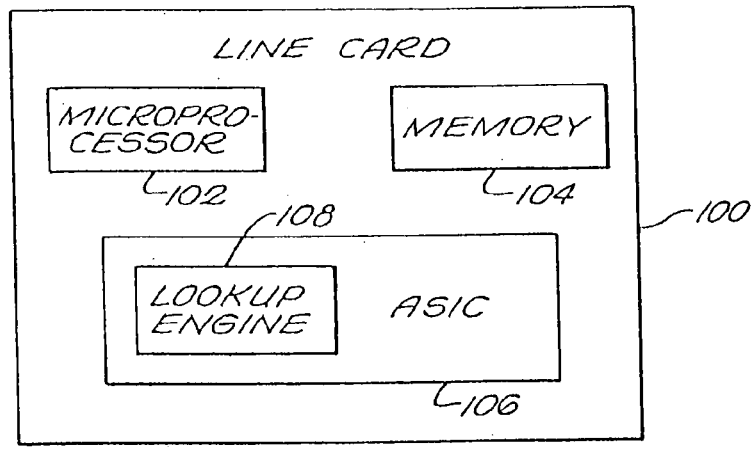
FIG. 8 depicts major components of a line card employed in the illustrative embodiment of FIGS. 6 and 7.

The line cards 76, 78, 80 and 82 contain intelligence for receiving and transmitting IP packets. Each line card 76, 78, 80 and 82 is positioned on a common chassis within the switch/router 66. Each line card 76, 78, 80 and 82 contains at least one application specific integrated circuit (ASIC) 84, 86, 88 and 90 that performs the IP forwarding lookup. FIG. 8 depicts major components a line card 100 in more detail. The line card 100 includes a microprocessor 102 and memory 104. The line card 100 also includes an ASIC 106 that has a lookup engine 108. The lookup engine 108 may be implemented in a number of different forms, including as a separate processor. Although the ASIC provides a hardware implementation for IP forwarding lookup, those skilled in the art will appreciate that the present invention also encompasses a software implementation. Other ASICs may be provided on the line card 100 to implement other functionality.

The ASIC 84, 86, 88 and 90 on each line card 76, 78, 80 and 82 is responsible for receiving incoming IP packets, determining the appropriate destination handle for the IP packets and passing the IP packets over the interconnect to the appropriate output line card. The destination handle specifies to the output line card how the IP packet should be forwarded. The interconnect 92 is a interconnection fabric that interconnects the line cards 76, 78, 80 and 82. A control processor 94 oversees and manages operations within the portion of the switch/router 66 shown in FIG. 7.

Those skilled in the art will appreciate that the present invention need not be practiced with a switch/router configuration like that shown in FIGS. 6 and 7. The depiction shown in FIG. 6 is intended to be illustrative and not limiting of the present invention. For example, the IP forwarding could be performed in a computer system, such as a personal computer. Moreover, the IP forwarding lookup need not be performed by an ASIC but rather may be performed by a dedicated forwarding microprocessor or by a state machine. As mentioned above, the IP forwarding lookup may be implemented solely by software. In addition, the intelligence need not reside at the line cards but rather claims line cards may be used with an intelligent processor performing the IP forwarding lookup. Still further, the switch/router need not have four line cards but rather may have a different number of line cards. The input data need not be SONET streams holding data in SONET frames. Other types of data formats and streams may be received in practicing the present invention.

An example is helpful to illustrate operation of the switch/router 66 in forwarding an IP packet. Suppose that an IP packet is received by SONET multiplexer 74. The IP packet is then received by the line card 76 and processed by the ASIC 84. The ASIC 84 directs the IP packet over the interconnect 92 to line card 82. Line card 82 subsequently directs the IP packet out towards SONET mux 72 so that the IP packet may be output toward the appropriate destination.

Figure 9:
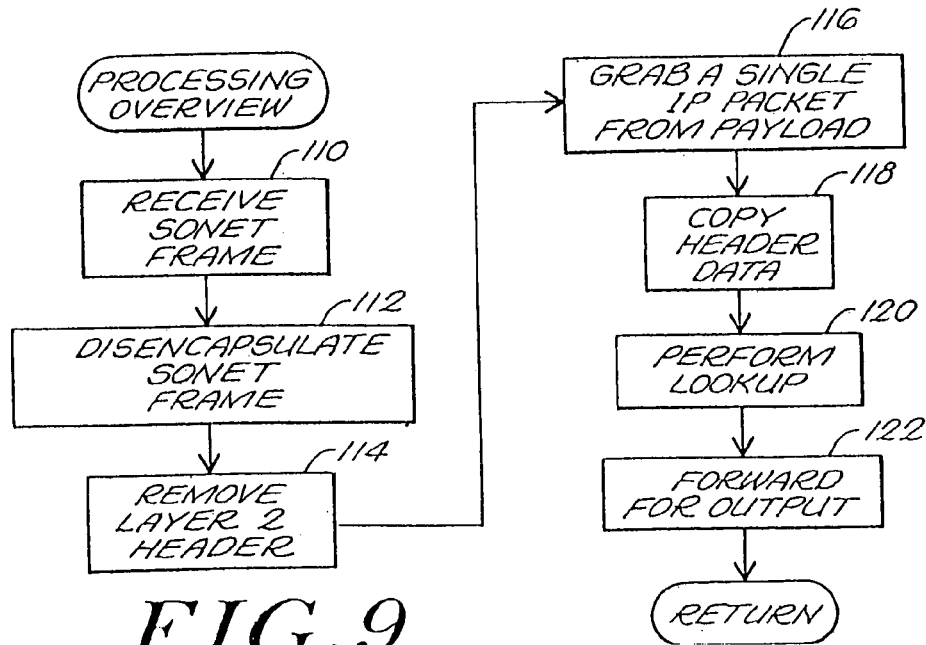
FIG. 9 is a flow chart illustrating the steps that are performed in processing an incoming frame of data to properly forward an IP packet in the illustrative embodiment of FIGS. 6 and 7.

FIG. 9 is a flow chart that provides an overview of the processing performed on data that is received by the switch/router 66. It is presumed that this data contains at least one IP packet. Initially, the data start off in state 128 (FIG. 10) where a SONET frame 130 is received from one of the links. The SONET frame 130 encapsulates a frame of data that is transmitted in the format identified by the SONET standard. FIG. 11 provides a block diagram illustrating the format of a SONET frame 130. A SONET frame 130 includes 90 octets (8 bit bytes) across and 9 rows down. The payload is contained in the synchronous payload envelope (SPE). The SPE contains 9 bytes that are dedicated to path overhead (OH). The SONET frame 130 also contains section overhead 146 and line overhead 148. The section overhead 146 and line overhead 148 are part of the SONET transport overhead. In this context, "overhead" refers to header information that is provided for various layers of the computer network.

Figure 10:
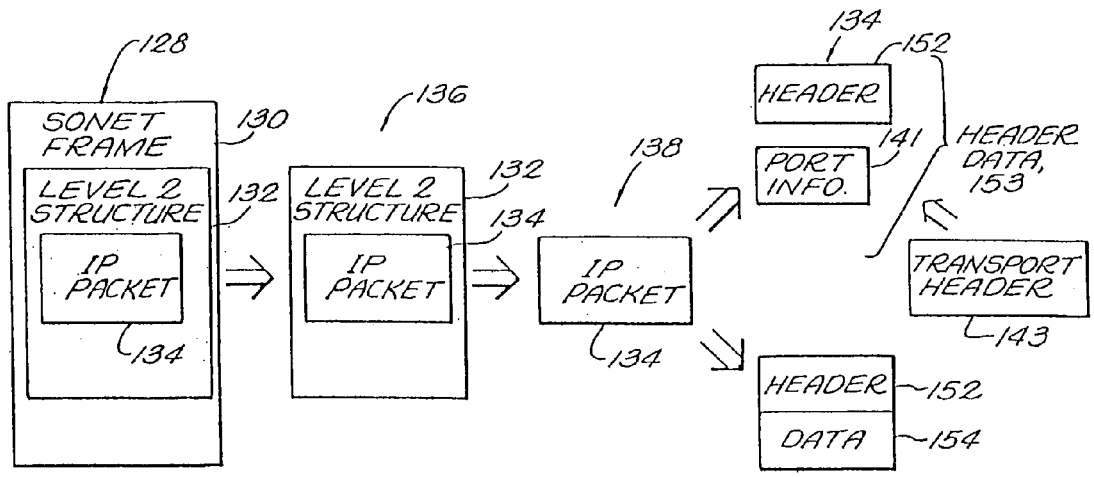
FIG. 10 illustrates the manipulation of data in the illustrative embodiment of the present invention.
Figure 11:
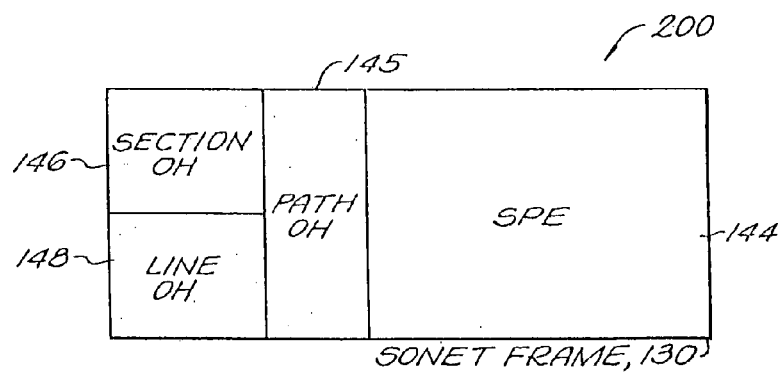
FIG. 11 illustrates the format of a SONET frame.

As can be seen in FIG. 10 the SONET frame 130 encapsulates a layer two structure (i.e. a structure provided by a layer two protocol, where layer two is defined by the OSI model). At least one IP packet 134 is held within the SONET frame 130 and the level two structure 132. The SONET frame is then decapsulated by the switch/router 66 (step 112 in FIG. 9). The switch/router 66 contains hardware that is designed for decapsulating the SONET frame. After decapsulation, the layer two structure 132 that contains the IP packet 134 is exposed (as indicated by state 136 in FIG. 10).

The switch/router 66 then peels open the layer two structure 134 by removing the layer two header so as to gain access to one or more IP packets 134 (step 114 in FIG. 9). The layer two structure may be, for example, a point-to-point protocol (PPP) frame, an ATM cell or a frame relay frame.

The lookup engine 108 of the ASIC 106 obtains a single IP packet from the layer two structure (step 116 in FIG. 9). The ASIC 106 knows that the layer two structure contains IP packets based upon interface information. The switch/router 66 maintains interface information regarding interfaces in which incoming data is received. Each interface is associated with a particular line card and port. The interface information identifies the nature of the data that is being received. For instance, the data may be identified as containing IP packets.

Figure 12:
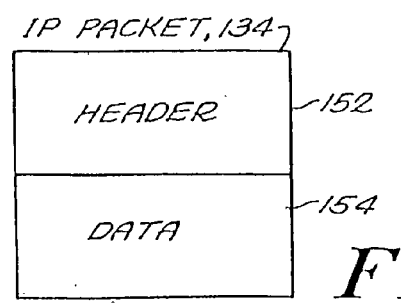
FIG. 12 illustrates the major components of an IP packet.

The IP header 152 (FIG. 10) from the IP packet 134 is copied along with some port information 141 from the transport header 143 to produce header data 153 (step 118 in FIG. 9). As shown in FIG. 12, the IP packet 134 includes a header 152 and data 154. Thus, in step 119, the data being processed transitions from state 138 to state 139 (see FIG. 10).

Figure 13:
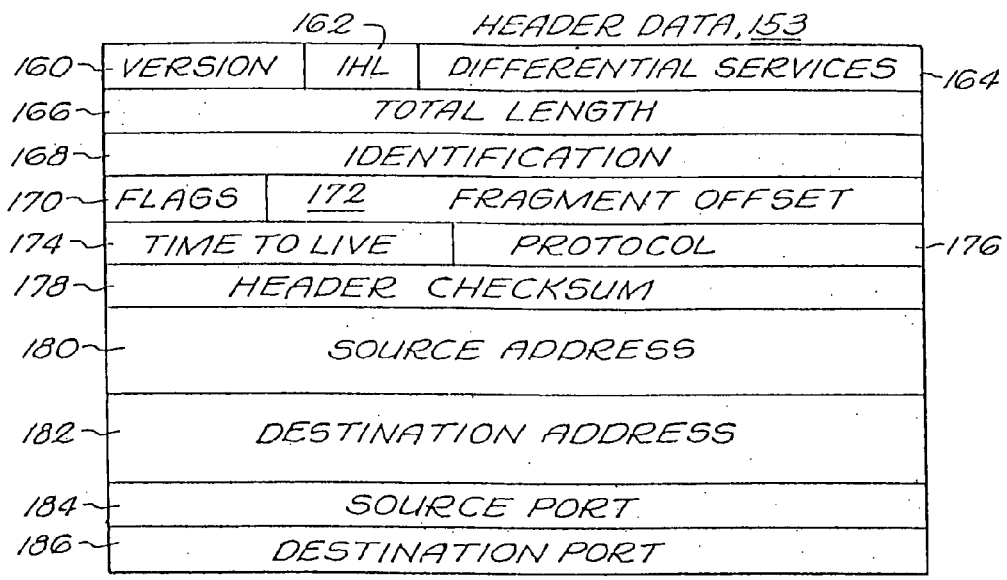
FIG. 13 illustrates the format of header data used in IP forwarding lookup.

FIG. 13 shows an example of the header data 152 that is used for IP forwarding lookup for IP version 4. All of the fields in the header data 153 other than fields 184 and 186 (which are copied from the transport header 143) are copied from the IP header 152. The header data 153 includes a version field 160 that holds information regarding the version of the IP protocol being used. For version 4 IP packets, this field 160 holds a value of 4. The Internet header length (IHL) field 162 identifies the length of the header in multiples of 4 octets. The differential services (DF) 164 holds a number that identifies a particular handling or treatment for the packet. The total length field 166 holds information regarding the total length of a packet before any fragmentation occurs. The identification field provides an identification value for the packet that may be used if the packet is later fragmented to associate the fragments with the original packet.

The header data 153 includes flags 170. The flags 170 include a DF flag and a MF flag. the DF ("don't fragment") flag indicates whether a datagram (carried at least in part by the packet) is to be fragmented. The MF ("more fragment") flag identifies whether there are more fragments or whether the packet holds the last fragment of the datagram. The fragment offset field 172 holds an offset value that identifies the offset at which the fragment belongs to the reassembled packet. The time to live field 174 identifies the time period for which the packet is valid and after which the packet should be discarded. The protocol field 176 holds a value that allows the network layer of the destination end node to know which protocol running within the end node should receive the packet. A header check sum field 178 is provided. The header data 153 also includes a source address 180 that identifies the source for which the packet originated. A destination address field 182 holds a destination address for the destination to which the IP packet is to be forwarded. The header data 153 also includes a source port field 184 and a destination port field 186 that are copied from the transport header for identifying respective ports. The port fields 184 and 186 may be used in quality of service (QOS) processing or in other fashions, such as access control filtering.

Once the header data 153 has been gathered, the destination address 182 may be used to perform a forwarding lookup within the forwarding lookup arrays (step 120 in FIG. 9). The IP forwarding lookup need not rely solely on the destination address; rather additional fields in the header data 153 may be used in conjunction with the destination address. For instance, the source address, source port and destination port may be used along with the destination address. These other fields may be used in providing certain QOS. For purposes of simplicity, the discussion below will initially focus on the instance wherein only the destination address is relied upon. This lookup identifies where the IP packet should be output by the switch/router 66. The lookup process will be described in more detail below. The IP packet then is forwarded across the interconnect 92 to a line card so as to be output from the switch/router 66 (step 122 in FIG. 9).

Packets may require a QOS processing or not. Packets that require a QOS processing may be subject to a different QOS than other types of packets. QOS processing evaluates additional fields in the header data 153 to determine whether a packet is to be classified into a specific QOS flow or not. A QOS processing identifies these flows and segregates such packets for special processing. A filter specification identifies what fields are evaluated and the values the fields should have for a given type of QOS. As a result, certain packets may be routed based upon the fields evaluated during QOS processing rather than based upon the destination address alone. The destination address case is discussed here as the basic approach and may be used in conjunction with QOS processing to determine how to forward an IP packet.

Figure 14:
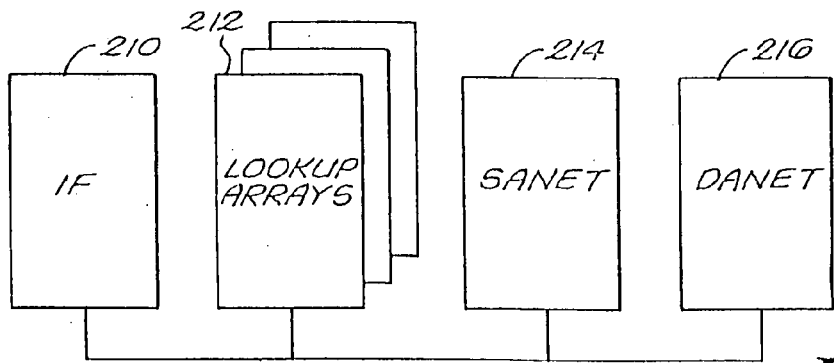
FIG. 14 illustrates structures held in memory that are used in performing IP lookup in the illustrative embodiment of the present invention.
Figure 15:
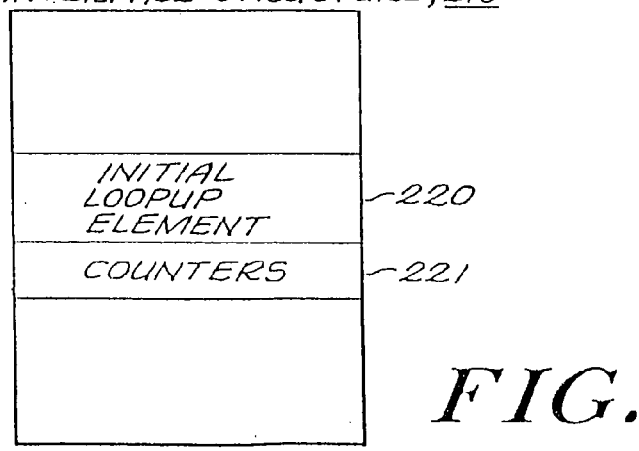
FIG. 15 illustrates an interface structure.

In performing the forwarding lookup, the lookup engine 108 uses a number of internal structures, including tables, arrays and other data structures. FIG. 14 depicts several of the major varieties of structures that are utilized during a forwarding lookup for IP packets. Interface structures 210 contain information regarding interfaces. An interface generally refers to a link with another switching node in a computer network. FIG. 15 shows an example of an interface structure 210 for a given interface. The interface structure 210 also contains an initial lookup element 220. The initial lookup element 220 is an array lookup element that contains an initial instruction that is executed at the beginning of forwarding lookup for an IP packet. The use of this initial lookup element 220 will be described in more detail below. The interface structure 210 may also contain a number of counters 221 that hold counts which are useful in gathering statistics regarding traffic over the interface.

Figure 16:
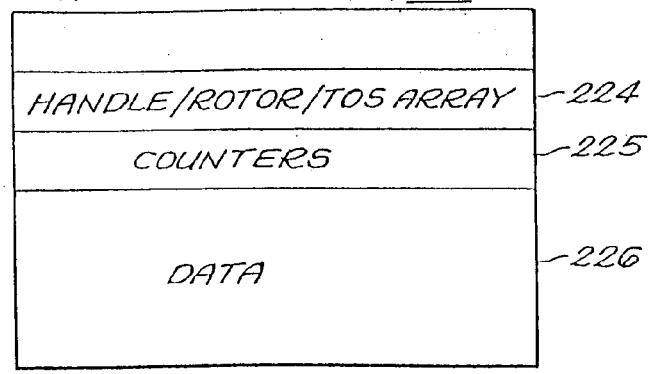
FIG. 16 illustrates a DANET structure.

The forwarding lookup also uses lookup arrays 212 composed of lookup elements. The format and use of these lookup elements will be described in more detail below. The forwarding lookup may also access a SANET 214 or a DANET 216. A SANET 214 is a data structure that holds a number of structures for respective source addresses. The structures hold useful information regarding source addresses that may be exploited for QOS and TOS. The DANET 216 holds DANET structures that contain information regarding destination addresses that is used in next hop determination. The DANET structures have a format like that shown in FIG. 16. In particular, each DANET structure 222 holds a field 224 that may contain a destination handle, a pointer to a TOS array or a pointer to a rotor. As mentioned above, a destination handle is a composite data structure that holds useful information regarding where a given IP packet should be directed so that it is properly output towards a destination. The switch/router 66 uses the destination handle on the transmission side to determine where to send an IP packet (i.e. what line card and output port should be used). Field 224 may instead contain a pointer to a rotor that contains a set of destination handles or a pointer to a type of service (TOS) array that holds a set of destination handles. The destination handles in the TOS array are indexed by a TOS parameter. The DANET structure 222 contains a number of counters 225 including packet counters and byte counters. These counters 225 are useful in monitoring traffic to a destination and may be used in QOS processing. The DANET structure 222 may also contain other data 226.

Figure 17:
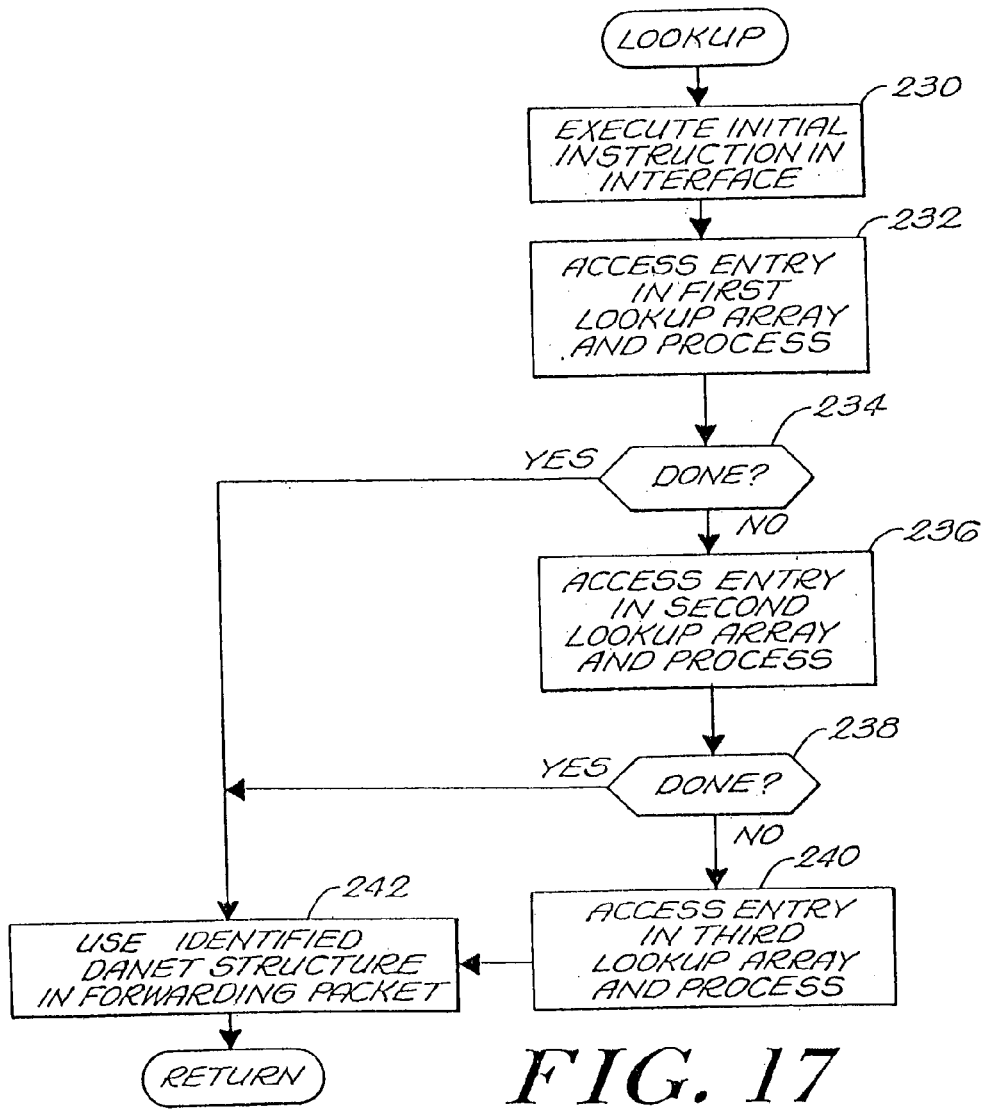
FIG. 17 is a flow chart illustrating the steps that are performed during IP lookup in accordance with the illustrative embodiment of the present invention.
Figure 18:
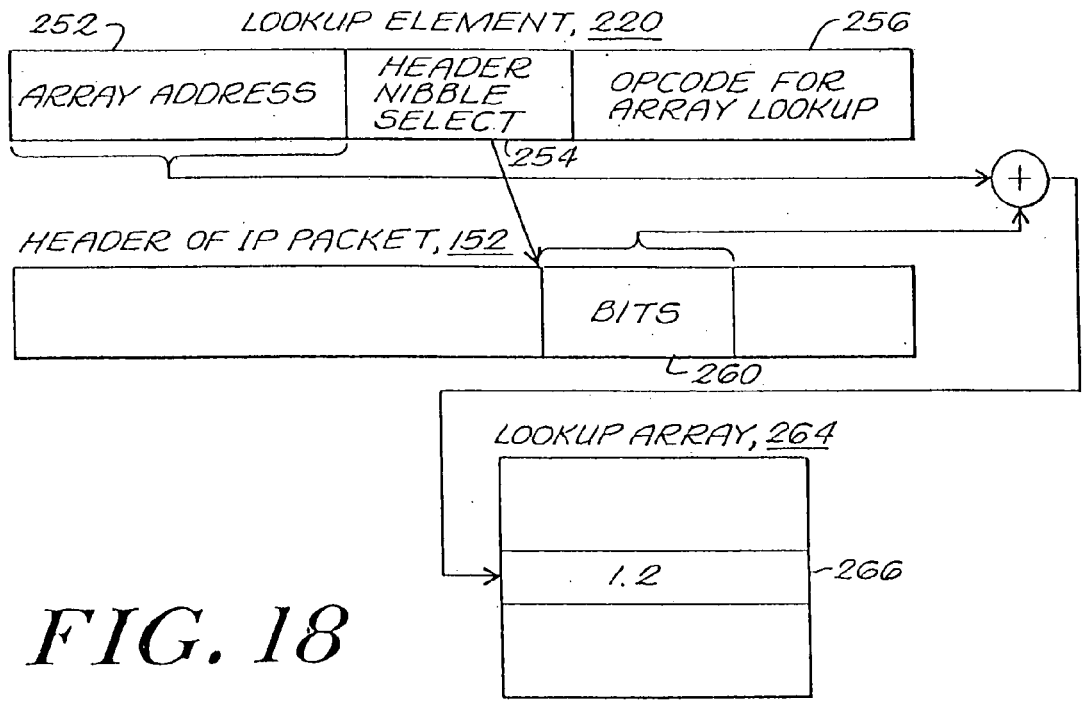
FIG. 18 depicts the use of a lookup element in the illustrative embodiment of the present invention.

FIG. 17 provides a flow chart of the steps that are performed during best-effort forwarding lookup for a unicast IP packet. The lookup determines how to send the IP packet to the next hop toward the destination. The switch/router 66 knows the interface on which the IP packet arrived. The interface structure for the associated interface is accessed, and the lookup engine 108 processes the initial lookup element contained in the interface structure (step 230 in FIG. 17). As shown in FIG. 15, the interface structure 210 includes a lookup array element 220 that contains an instruction. The instruction in an array lookup instruction which identifies the array to which the lookup is to be applied. The lookup element 220 (FIG. 18) contains an opcode 256 for array lookup. The lookup element 220 also contains an array address 252 and a header nibble select 254. A nibble is 4 bits, and different nibbles within the header may be utilized to generate an index to an array lookup element in a lookup array. Information in the header, other than the destination address may be used for lookup, and the header nibble select 254 identifies what information to use for lookup. The array address 252 identifies the location of the lookup array 264 and may be combined with the 16 address bits 260 to locate the lookup element 266 within the lookup array 264. Thus, initially the entry 266 in the first lookup array 264 is accessed and processed (step 232 in FIG. 17).

Figure 19A:
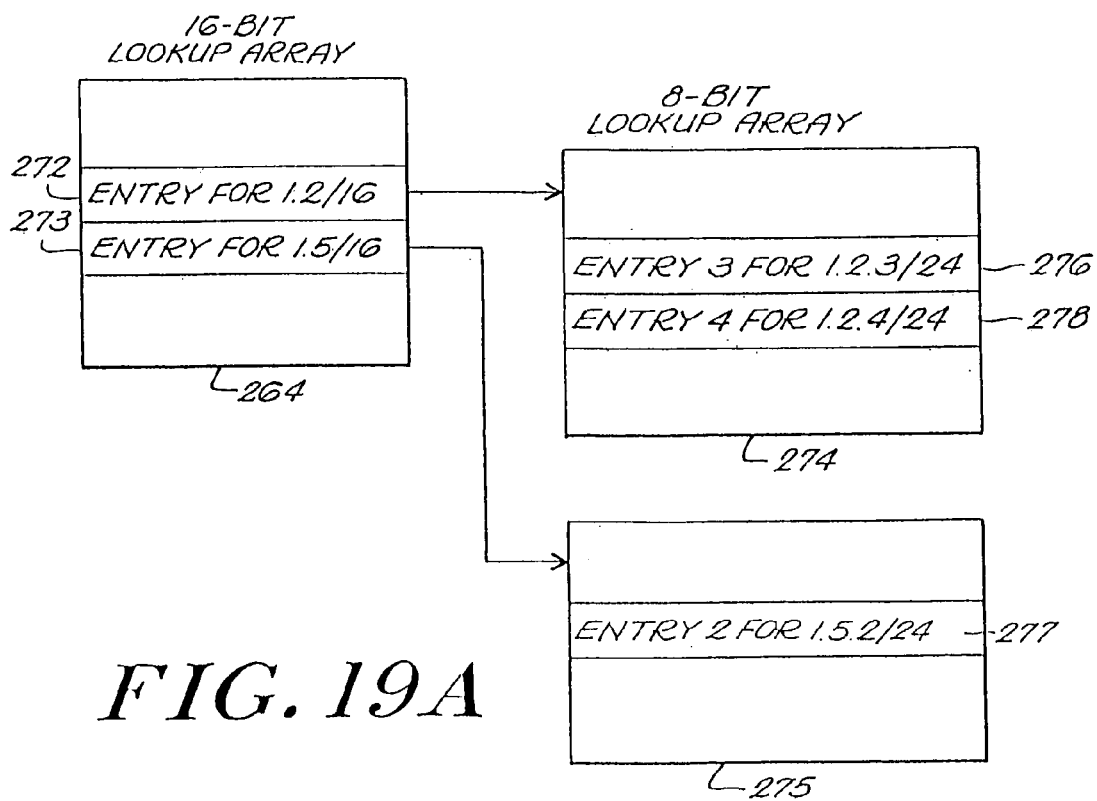
FIG. 19A illustrates an example where a first lookup array references a second lookup array.
Figure 20:
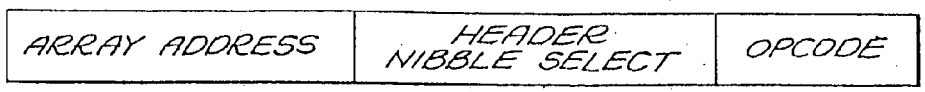
FIG. 20 illustrates the logical format of a lookup element.

As shown in FIG. 20, this lookup element in the first forwarding lookup array 264 contains an array address, header nibble select and opcode. The opcode may direct the lookup engine 108 to another forwarding lookup array. Hence, the next successive lookup array must be accessed. FIG. 19A shows an example wherein a lookup element 272 in lookup array 264 identifies an array address for a second lookup array 274. The second lookup array 274 is indexed by the third byte within the destination address. The lookup elements in the second lookup array 274 include lookup elements 276 and 278 for the prefixes 1.2.3 and 1.2.4, respectively.

FIG. 19A also shows an example wherein a lookup element 273 contains an opcode that directs the lookup to a different eight bit lookup array 275. The third byte of the destination address is used as an index into this eight bit lookup array 275 to locate a lookup element 277. As was mentioned above, the lookup arrays are organized as a tree with the top level of the tree containing references to the next level of the tree. Hence, there may be a significant number of eight bit lookup arrays referenced by the sixteen bit lookup array in the implementation described for the illustrative embodiment of the present invention.

The above discussion has assumed that the instruction in the lookup element contained in the first lookup array is an array lookup instruction for a second lookup array. In some instances, the first lookup element may contain a set DANET instruction that associates a given DANET structure with the IP packet. This DANET structure contains a destination handle, or a pointer to a rotor or a TOS array from which a destination handle may be derived. In such a case, the lookup element is associated with a prefix that matches the first 16 bits of the destination address for the IP packet and the known forwarding information may be employed to forward the IP packet. Such a set DANET instruction may be found at any of the different layers of tables of forwarding lookup arrays, depending on where a match is found.

Figure 19B:
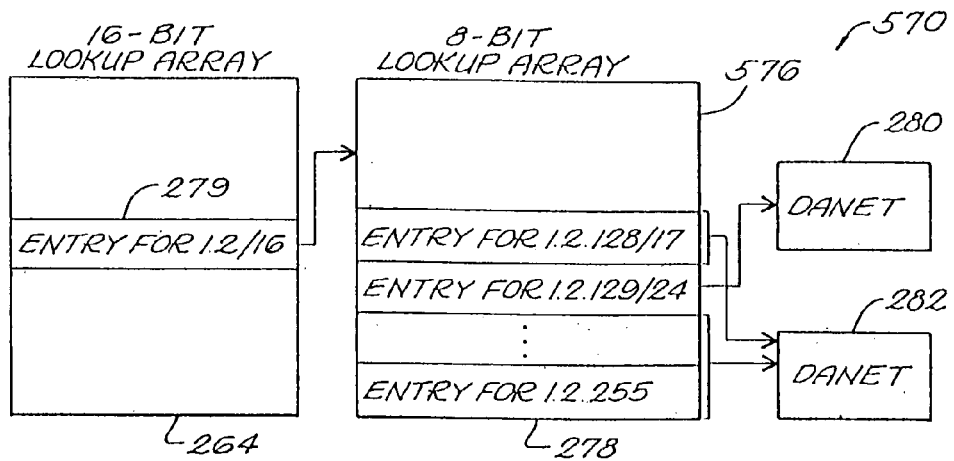
FIG. 19B illustrates an example where "smearing" is used so that a range of entries reference a common DANET structure.

Multiple lookup elements may reference the same next level array or may references the same DANET structure. FIG. 19B shows an instance wherein an eight bit lookup array 278 is referenced by a lookup array element 279 in the sixteen bit lookup array 264. The eight bit lookup array 278 contains 256 entries corresponding to the 256 possibilities of possible values that the third byte of the destination address may assume. The entries in the range for prefixes 1.2.128 through 1.2.255 all point to DANET structure 282 as the DANET structure to be used, except for the entry for 1.2.129. The entry for 1.2.129 indicates that a different DANET structure 280 is to be utilized. DANET structure 280 is for prefix 1.2.129/25 and DANET structure 28 is for prefix 1.2.1.128/17. This smearing provides an optimization so that a large number of copies of a given DANET structure need not be utilized, and, thus, the smearing saves storage space. This approach also accounts for instances wherein the matching prefix is between 17 and 23 bits in length.

In step 234, the lookup engine 238 determines whether it is done or not. The instruction that is executed by the lookup engine in step 232 will inform the lookup engine whether it is done or not. Where a match is found, the DANET structure that is set by the set DANET instruction is used in forwarding the packet and IP lookup is complete (step 242 in FIG. 17). In other instances, there is no matching prefix of 16 bits or less and the lookup must continue with the second forwarding lookup array, which contains 28 elements and is induced by the third byte of the destination address.

If the lookup engine 108 is directed to look to the second forwarding lookup array, the lookup engine accesses the appropriate lookup element and the second lookup array then processes the entry (step 236 in FIG. 17). This lookup element may contain an instruction of the same variety of those discussed above relative to the first lookup array. In step 238, the lookup engine 108 determines whether it is done or not. If the lookup engine is not done, the instruction that was processed advises the lookup engine to look to the third lookup array to determine how to process the IP packet. This means that there was no matching prefix of 24 bits in length or less. Hence, the third and final forwarding lookup array containing 28 entries is to be accessed. As such, the lookup engine 108 accesses a lookup element in the third lookup array and processes the element (step 240 in FIG. 17). The identified DANET structure is then used in forwarding the packet (step 242 in FIG. 17).

Figure 19C:
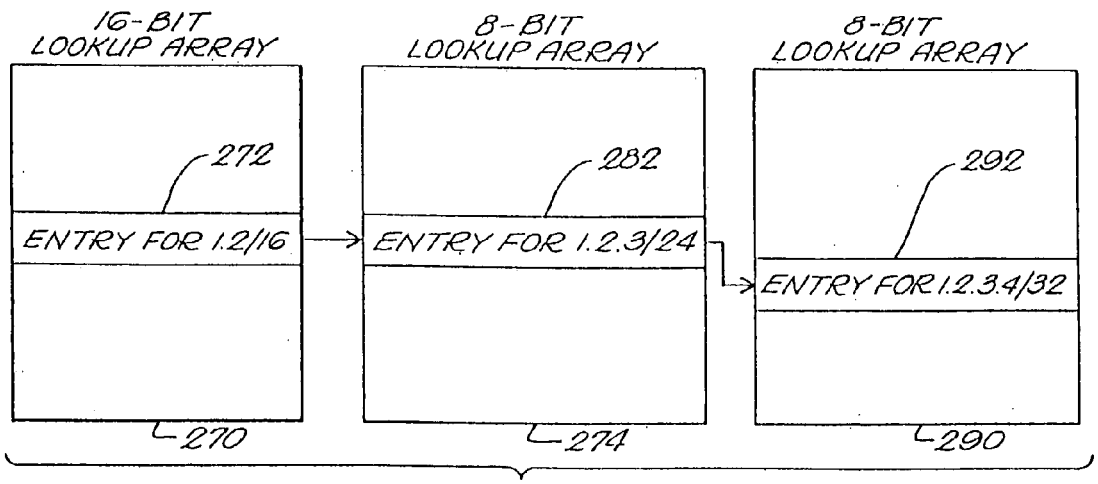
FIG. 19C illustrates an example where a first lookup array references an entry in the second lookup array, which references an entry in a third lookup array.

FIG. 19C shows an example where lookup elements from all three levels of the forwarding lookup arrays are utilized. In particular, a lookup element 272 in the 16 bit or first lookup array 264 is processed and directs the lookup engine 108 to access lookup element 282 in the second lookup array 274. The lookup element 282 contains an instruction to perform an array lookup on lookup element 292 within the third forwarding lookup array. The instruction in lookup element 292 is executed to set the appropriate DANET structure so that it is associated with the IP packet.

Figure 21:
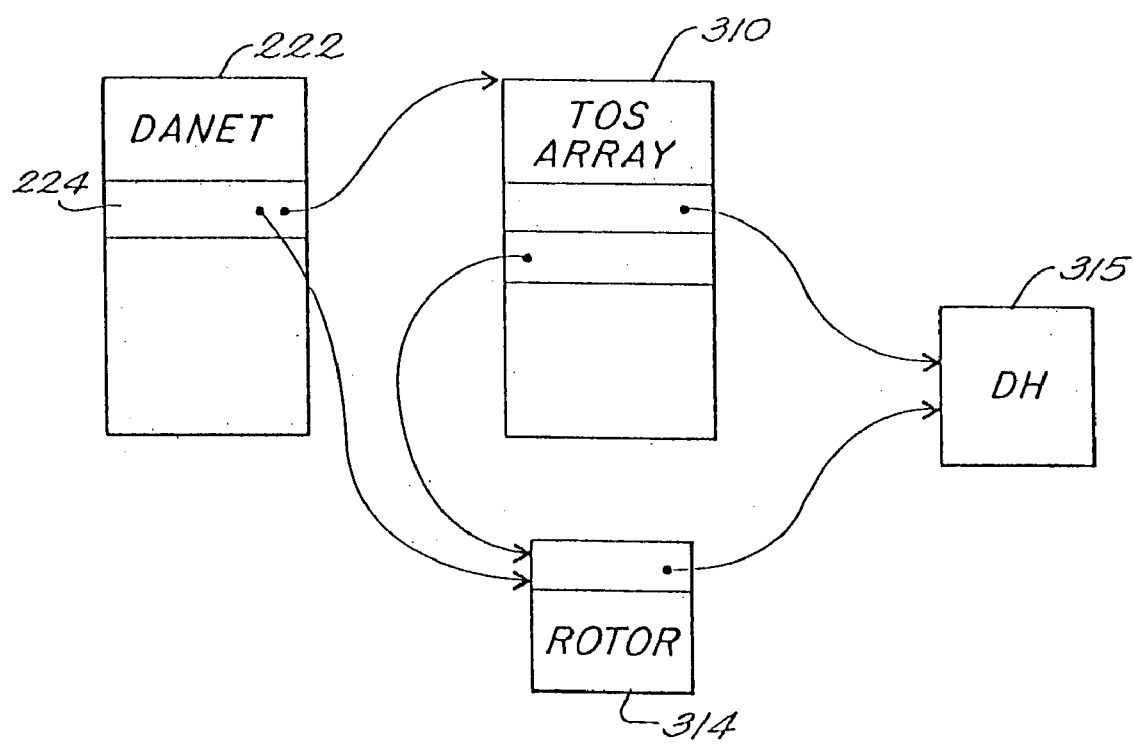
FIG. 21 is a block diagram that illustrates the use of a rotor pointer and a TOS array pointer to obtain a destination handle for an IP packet.

As was mentioned above, the DANET structure that is employed for use in forwarding an IP packet need not directly include the destination handle 215 (see FIG. 21) but rather may include an indirect reference to obtaining the destination handle. For example, The DANET structure 222 may include a field that contains a pointer to a TOS array 310, which is a destination handle array. The TOS array 310 is indexed by a TOS parameter. The TOS offered to a packet may vary and may be expressed as a TOS parameter value. This value may be taken from field 164 of the header date 153, for example. The TOS parameter value acts as an index to the TOS array 310 to select a destination handle for the IP packet. The DANET structure 222 may also contain a reference to a rotor 314 that, in turn, references a destination handle 315. The TOS array 310 may also contain a reference to a rotor 314 rather than a direct reference to a destination handle 314. The rotor 314 is a structure that contains a set of destination handles and is used in the illustrative embodiment to facilitate aggregation of multiple lower speed links to present a virtual higher speed link. The rotor leg (i.e. which entry in the rotor is used) may be programmatically selected by either a randomly generated index or based on a hash of the fields that identify the QOS flow for the packet.

While the present invention has been described with reference to an illustrative embodiment thereof, those skilled in the art will appreciate that various changes in form and in detail may be made without departing from the intended scope of the present invention as defined in the appended claims. For example, a different number of lookup arrays may be used and the lookups need not be arrays but may be organized differently such as lists, tables, etc. Furthermore, the arrays need not be indexed along byte boundaries. For instance, the first forwarding lookup array may be indexed by 15 bits rather than 16 bits. In addition, the array elements need not include instructions but rather may contain data or pointers.

What is claimed is:

1. In a device for forwarding data packets, the device having a memory containing storage locations, a method comprising:
   receiving header data of a network layer packet;
   selecting a first one of the storage locations based on a first set of bits contained in the header data; and
   executing an instruction stored at the first selected storage location;
   selecting a second one of the storage locations based on the executed instruction and a second set of bits contained in the header data; and
   selecting a third one of the storage locations based on contents of the second selected storage location and a third set of bits contained in the header data.

2. The method of claim 1, further comprising the step of forwarding the network layer packet based on the contents of the third selected storage location.

3. The method of claim 1 wherein the packet is an IP packet.

4. The method of claim 1, further comprising:
   retrieving, from a lookup element stored in a storage location of the storage locations, multiple bits that select the first set of bits from all of the bits contained in the header data.

5. The method of claim 4, further comprising:
   retrieving, from the first one of the storage locations, multiple bits that select the second set of bits from all of the bits contained in the header data.

6. The method of claim 5, further comprising:
   retrieving, from the second one of the storage locations, multiple bits that select the third set of bits from all of the bits contained in the header data.

7. In a device for forwarding an Internet Protocol (IP) packet toward a destination having a destination address containing a sequence of bits, a method comprising:
   using a first set of bits from the destination address of the IP packet as an index to locate a first entry in a first forwarding lookup that stores a first instruction and a first set of bits;
   executing the first instruction to, using the first set of bits, provide direction to a second forwarding lookup, using a second set of bits from the destination address as an index to locate the second entry in a second forwarding lookup that stores a second instruction and a second set of bits;
   executing the second instruction to provide direction, using the second set of bits, to a third forwarding lookup; and
   employing a third set of bits from the destination address as an index to locate a third entry in the third forwarding lookup and employing the contents of the third entry in forwarding the IP packet.

8. The method of claim 7 wherein the step of employing the contents of the second entry comprises executing an instruction contained in the second entry to forward the IP packet toward the destination address.

9. The method of claim 7 wherein the device includes an application specific integrated circuit (ASIC) and wherein the ASIC performs the steps of the method.

10. A switch/router for directing IP packets toward destinations, comprising:
    a first lookup array containing entries indexed by leading bits of destination addresses for IP packets, each entry containing an instruction to assist in forwarding an IP packet towards a destination;
    a second lookup array containing entries indexed by a successive set of bits that follow the leading bits in the destination addresses for IP packets, each entry containing an instruction to assist in forwarding an IP packet towards a destination;
    a third lookup array containing entries indexed by a set of trailing bits that follow the successive set of bits in the destination addresses for IP packets, each entry containing an instruction to assist in forwarding an IP packet; and
    a forwarding engine for forwarding IP packets to destinations, where for each IP packet being forwarded, said forwarding engine accesses at least one entry in the lookup arrays indexed by a portion of a destination address for the IP packet being forwarded and executing the instruction contained in the entry that is accessed.

11. The switch/router of claim 10 further comprising input ports and interface structures that hold information regarding the input ports on which IP packets arrive.

12. The switch/router of claim 11 wherein the interface structures contain instructions for directing the forwarding engine to access the first lookup array.

13. In a device for forwarding data packets wherein the device includes a storage having storage locations, a computer-readable medium holding computer-executable instructions for performing a method, comprising:
    using a first set of multiple bits from header data for a network layer packet as an index to locate a selected first one of the storage locations that stores a first instruction;
    executing the first instruction to provide, using a second set of multiple bits from the header data, a location of a second one of the storage locations that stores a second instruction;
    executing the second instruction to provide, using a third set of multiple bits from the header data, a location of a third one of the storage locations, wherein the third one of the storage locations provides a third instruction regarding how the device should forward the network layer packet; and
    executing the third instruction to forward the network layer packet toward the destination.

14. The computer-readable medium of claim 13 where more than a byte from the destination address is used as the index.

15. The computer-readable medium of claim 13 wherein the network layer packet contains a header and wherein the method further comprises the step of extracting the information from the header.

16. The computer-readable medium of claim 13 wherein the packet is an IP packet.

17. In a device for forwarding an Internet Protocol (IP) packet toward a destination having a destination address composed of a sequence of bits, said device including a first forwarding lookup and a second forwarding lookup, a computer-readable medium holding computer-executable instructions for performing a method, the method comprising the steps of:

using a prefix of multiple bits from the destination address of the IP packet as an index to locate a first entry in the first forwarding lookup that stores a first instruction and a first set of bits;

executing the first instruction to provide direction, using the first set of bits, to the second forwarding lookup, using a next sequential set of bits following the prefix in the destination address as an index to locate a second entry in the second forwarding lookup, said second entry having contents, and employing the contents of the second entry in forwarding the IP packet toward the destination address.

18. The computer-readable medium of claim 17 wherein the step of employing the contents of the second entry comprises executing an instruction contained in the second entry to forward the IP packet toward the destination address.

* * * * *